United States Patent

Imamura

(10) Patent No.: US 7,609,928 B2
(45) Date of Patent: Oct. 27, 2009

(54) METHOD OF CONNECTING OPTICAL FIBERS

(75) Inventor: Katsunori Imamura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/176,487

(22) Filed: Jul. 21, 2008

(65) Prior Publication Data

US 2009/0080841 A1 Mar. 26, 2009

(30) Foreign Application Priority Data

Aug. 27, 2007 (JP) .............................. 2007-220174

(51) Int. Cl.
*G02B 6/02* (2006.01)
*G02B 6/32* (2006.01)
*G02B 6/255* (2006.01)
(52) U.S. Cl. ........................... 385/123; 385/125; 65/407
(58) Field of Classification Search ................. 385/123, 385/125; 65/385, 406–407
See application file for complete search history.

(56) References Cited

U.S. PATENT DOCUMENTS 7,106,932 B2 * 9/2006 Birks et al. ................. 385/123

FOREIGN PATENT DOCUMENTS

| JP | 2004-177804 | 6/2004 |
| JP | 2007-72418 | 3/2007 |

* cited by examiner

*Primary Examiner*—Frank G Font
*Assistant Examiner*—Michael P Mooney
(74) *Attorney, Agent, or Firm*—Oblon, Spivak, McClelland, Maier & Neustadt, L.L.P.

(57) ABSTRACT

A method of connecting a holey fiber to an optical fiber includes fusion splicing an end surface of the holey fiber and an end surface of the optical fiber thereby forming a joint section; and stretching the joint section while heating by pulling the holey fiber and the optical fiber away from each other in a longitudinal direction until an outer diameter of the joint section attains a predetermined value.

6 Claims, 6 Drawing Sheets

METHOD OF CONNECTING OPTICAL FIBERS

BACKGROUND OF THE INVENTION

1. Field of the Invention

The present invention relates to a method of connecting optical fibers.

2. Description of the Related Art

A holey fiber is an optical fiber having air holes arranged in a periodic manner in a cladding region. The cladding region surrounds a core region. The cladding region has reduced average refractive index because of the presence of the air holes so that a light passes almost entirely through the core region because of the total reflection of the light.

Because the refractive index of holey fibers can be controlled by controlling various parameters of the air holes, the holey fibers can realize unique properties that can not be realized in the other optical fibers such as endlessly single mode (ESM) and anomalous dispersion at a short wavelength. The ESM means that a cut-off wavelength is not present and a light is transmitted in a single mode at all wavelengths. With the ESM, it is possible to realize an optical transmission at a high transmission speed over a broadband.

A holey fiber is sometimes connected to another optical fiber, which can be a holey fiber or an ordinary optical fiber, to make a longer optical fiber. However, when the holey fiber is fusion spliced to another optical fiber, the air holes in an arc-discharged and heated joint section and in a vicinity of the joint section collapse. If the air holes collapse, it is difficult to confine light in the core region, so that confinement loss increases.

A conventional technology for reducing confinement loss is disclosed in Japanese Patent Application Laid-open No. 2004-177804. Specifically, duration or intensity of the arc discharge is adjusted to prevent the collapses of the air holes. Furthermore, Japanese Patent Application Laid-open No. 2007-72418 discloses another conventional technology in which fusion spliced portions are etched using etching solutions to attain a thin fiber after fusion splicing a double clad holey fiber and a multimode optical fiber without air holes. Hydrofluoric acid can be used as the etching solution.

However, with the former conventional technology, the arc discharge duration or intensity are restricted, so that the desirable mechanical strength of the spliced portions can not be maintained. With the latter conventional technology, originally thin optical fibers are made to be thinner, so that strict controls of etching amounts are required. Single-mode holey fibers are inherently ultrathin, so that the etching is difficult to be applied to the single-mode holey fibers. Furthermore, the etching may cause surface exposures of the air holes which may increase confinement loss due to entries of particles or foreign objects into the exposed air holes.

SUMMARY OF THE INVENTION

It is an object of the present invention to at least partially solve the problems in the conventional technology.

According to an aspect of the present invention, there is provided a method of connecting a holey fiber to an optical fiber. The holey fiber includes a first core region and a first cladding region surrounding the first core region and having air holes arranged around the first core region, and the optical fiber includes at least a second core region and a second cladding region surrounding the second core region. The method includes fusion splicing an end surface of the holey fiber and an end surface of the optical fiber thereby forming a joint section; and stretching the joint section while heating by pulling the holey fiber and the optical fiber away from each other in a longitudinal direction until an outer diameter of the joint section attains a predetermined value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the following embodiments.

Figure 1:
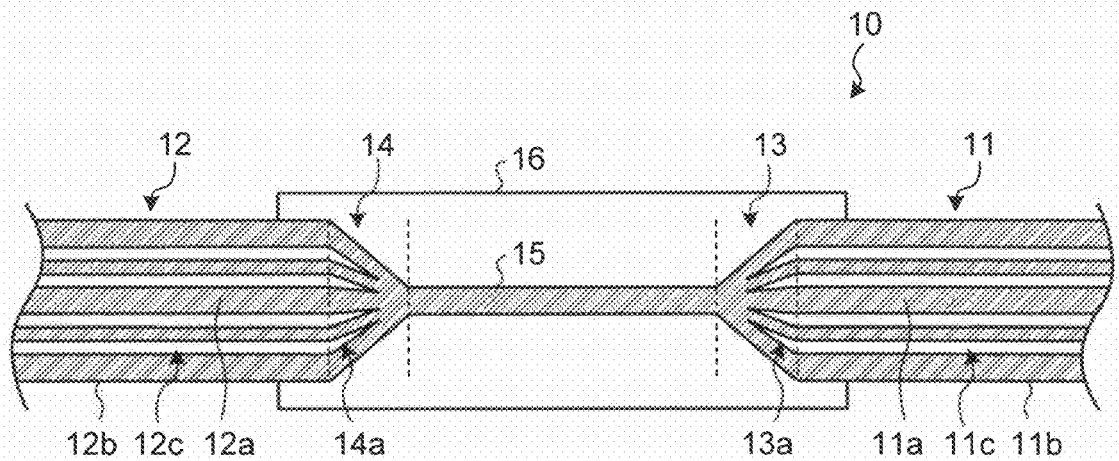
FIG. 1 is a cross section of a joint section of holey fibers manufactured by a method according to a first embodiment of the present invention along the length of the holey fibers.
Figure 2:
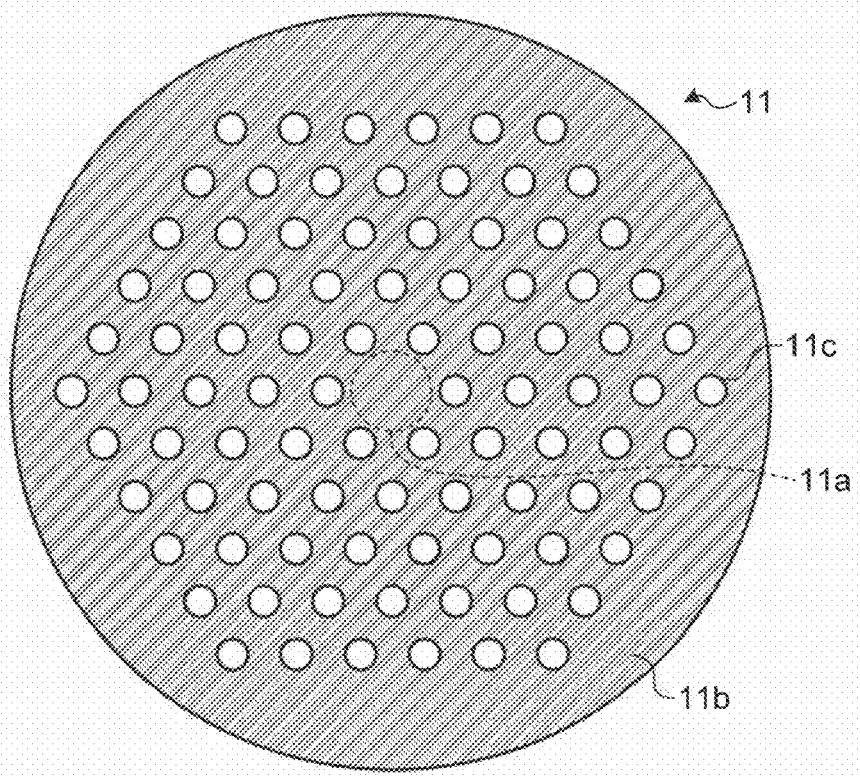
FIG. 2 is a cross section of the holey fiber shown in FIG. 1 perpendicular to the length of the holey fiber.

FIG. 1 is a cross section of a connection structure 10 of holey fibers 11 and 12 manufactured by a method according to a first embodiment of the present invention along the length of the optical fibers. FIG. 2 is a cross section of the holey fiber 11 perpendicular to the length of the holey fiber 11. The connection structure 10 is formed by connecting the holey fibers 11 and 12 through contracting sections 13 and 14, and a stretched section 15. A protection member 16 covers the contracting sections 13 and 14, and the stretched section 15.

As shown in FIG. 2, the holey fiber 11 is a single-mode optical fiber having a plurality of air holes 11c arranged in a cladding region 11b surrounding a core region 11a. The core region 11a and the cladding region 11b are made of pure silica glass, i.e., silica glass without dopant, to control refractive index of optical fibers. Alternatively, the core region 11a and the cladding region 11b can be made of other glass materials as far as the same materials are used between the core region 11a and the cladding region 11b. A diameter of the core region 11a is about 10 micrometers and an outer diameter of the cladding region 11b is about 125 micrometers. The air holes 11c are arranged in a triangular lattice L around the core region 11a. The diameter of each of the air holes 11c, a pitch between centers of the air holes 11c and the total number of the air holes 11c are determined so as to achieve predetermined optical properties of the holey fiber 11. The holey fiber 12 has the same structure as that of the holey fiber 11. That is, the holey fiber 12 is a single-mode optical fiber having a plurality of air holes 12c arranged in a cladding region 12b surrounding a core region 12a.

The contracting section 13 is made of pure silica glass and is coupled to an end surface of the holey fiber 11. The contracting section 13 is made to gradually taper from the holey fiber 11. The contracting section 13 includes air holes 13a to be coupled to the air holes 11c of the holey fiber 11; however, the hole diameter and the pitch of the air holes 13a gradually reduce and finally the air holes 13a are closed. Similarly, the contracting section 14 is made of pure silica glass, and includes air holes 14a to be coupled to the air holes 12c of the holey fiber 12. The hole diameter and the pitch of the air holes 14a gradually reduce and finally the air holes 12c are closed.

The stretched section 15 is made of pure silica glass and has such a shape that an outer diameter is substantially uniform throughout the length of the stretched section 15 or a center portion of the stretched section 15 has a smaller outer diameter than those of the other sections of the stretched section 15. The stretched section 15 connects the contracting sections 13 and 14 to each other. The stretched section 15 is arranged in a substantially concentric manner with the core regions 11a and 12a and has a substantially same outer diameter as those of the core regions 11a and 12a.

The protection member 16 is made of resin having a lower refractive index than that of the stretched section 15. The protection member 16 is formed around the contracting sections 13 and 14, and the stretched section 15 to protect them.

Because of the refractive index difference between the protection member 16 and the stretched section 15, light is confined into the stretched section 15. Therefore, transmission loss is low when light passes from the core region 11a to the core region 12a. Similarly, transmission loss is low when light passes from the core region 12a to the core region 11a. Thus, in the connection structure 10, the holey fibers 11 and 12 are connected with low splice loss.

FIGS. 3 to 6 are schematic diagrams for explaining the method of forming the connection structure 10.

Figure 3:
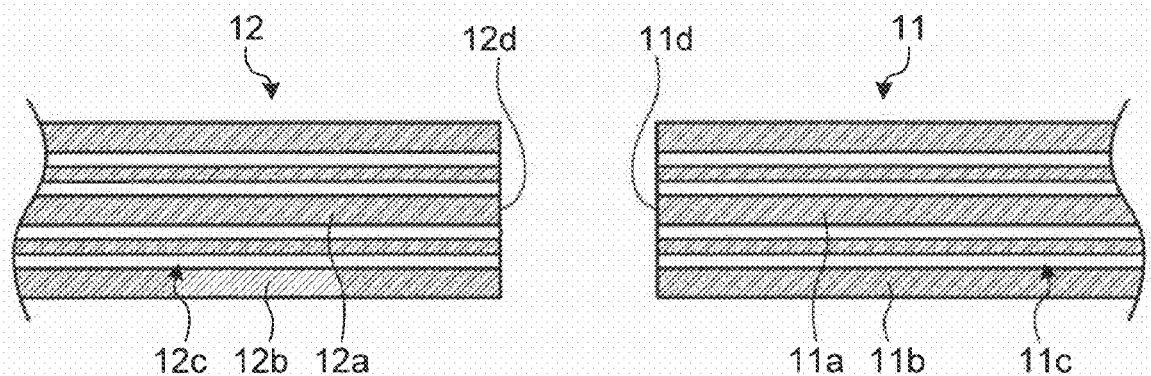
FIGS. 3 to 6 are schematic diagrams for explaining the method of forming the connection structure shown in FIG. 1.

As shown in FIG. 3, an end surface 11d of the holey fiber 11 is brought closer to an end surface 12d of the holey fiber 12.

Figure 4:
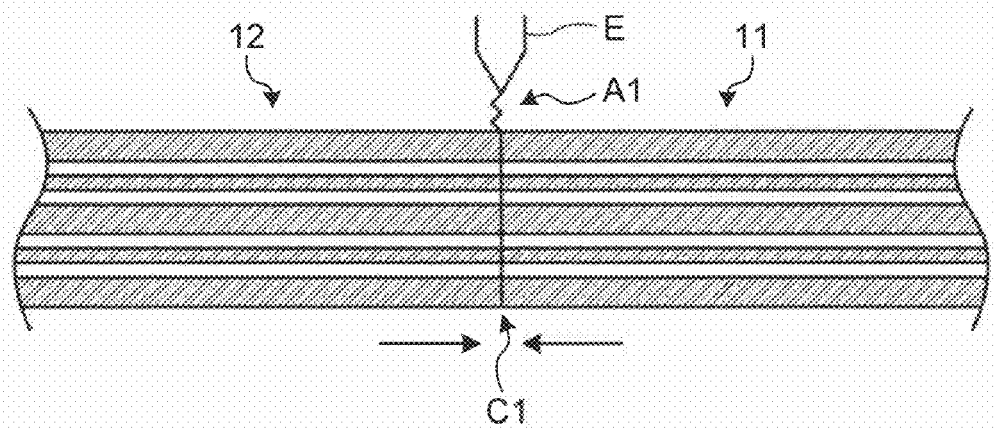

Then, the holey fibers 11 and 12 are subjected to fusion splicing as shown in FIG. 4. Specifically, arc-discharging "A1" is performed from a rod-shaped electrode "E" to a splicing point "C1". As a result, the holey fibers 11 and 12 are butt jointed due to fusion-splicing. The duration and intensity of the arc discharge are determined so that the holey fibers 11 and 12 are connected with a good mechanical strength. Desired exemplary settings are a discharge intensity of 60 milliamperes and a discharge duration of 1.5 seconds.

Figure 5:
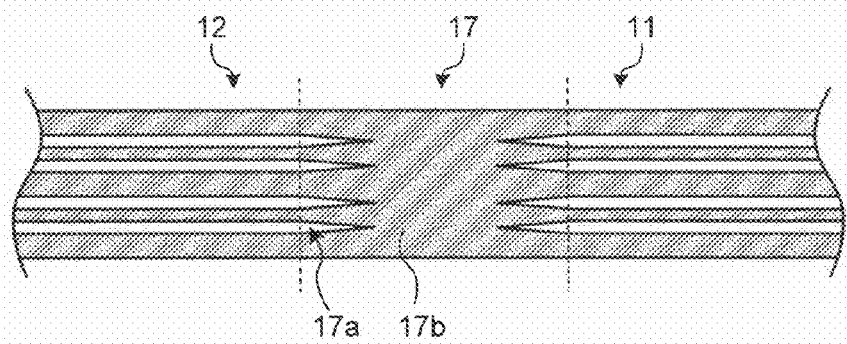

As shown in FIG. 5, a joint section 17 is formed between the holey fibers 11 and 12 when they are fusion-spliced. The joint section 17 includes air holes 17a at its end surfaces coupled to the holey fibers 11 and 12. The air holes 17a gradually taper toward a center section and close at a point so that there is formed a solid portion 17b without air holes.

Figure 6:
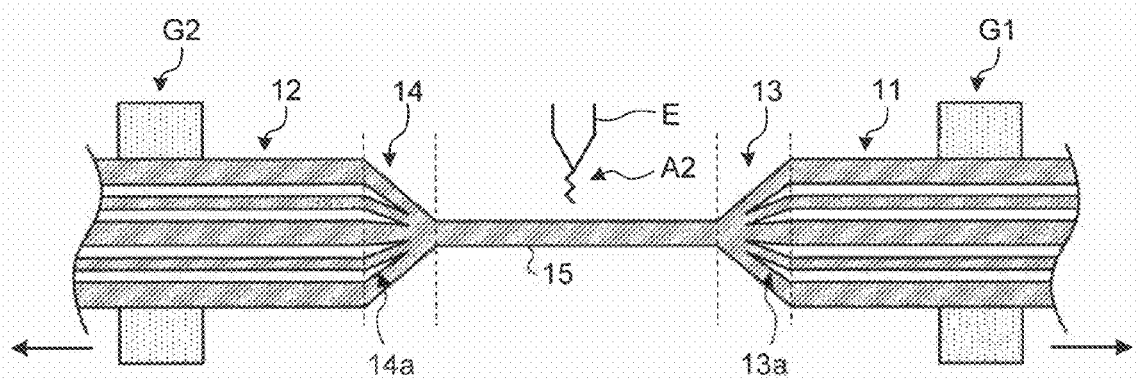

The stretched section 15 is then formed from the joint section 17 as shown in FIG. 6. Specifically, the holey fibers 11 and 12 are held by holding units G1 and G2, each of which includes a v-groove (not shown) and a retainer plate (not shown). In this situation, the holey fibers 11 and 12 are pulled away from each other while being subjected to the arc-discharging "A1" from the electrode "E" to the joint section 17. As a result, the joint section 17 is stretched, resulting in formations of the contracting sections 13 and 14, and the stretched section 15. The pulling of the holey fibers 11 and 12 is continued until a desired outer diameter of the stretched section 15 is attained. After completion of formation of the desired stretched section 15, finally, the protection member 16 is formed around the stretched section 15. Forming of the protection member 16 can be conducted with, for example, a commercially available recoat device.

When stretching the joint section 17, a desired outer diameter of the joint section 17 is easily attained by adjusting the discharge intensity, duration and tensions applied to the joint section 17. For example, a discharge intensity of 10 milliamperes and a discharge duration of 3 seconds are preferable. Furthermore, during the stretching process, there is little risk of surface exposures of the air holes in the holey fibers 11 and 12, and in the contracting sections 13 and 14.

As explained above, a light confinement structure is attained in the connection structure 10 with the stretched section 15 and the protection member 16. Therefore, even if the air holes in the center section collapse due to the fusion splicing at a strong intensity to connect the holey fibers 11 and 12 in order to obtain a good mechanical strength, the splice loss can be maintained low. In other words, if two holey fibers are fusion-spliced by using the method according to the first embodiment, it is possible to achieve low splice loss while maintaining a high mechanical strength at the joint section of the holey fibers.

Thus, it is possible to easily manufacture a connection structure of optical fibers with a high mechanical strength and low splice loss.

Figure 7:
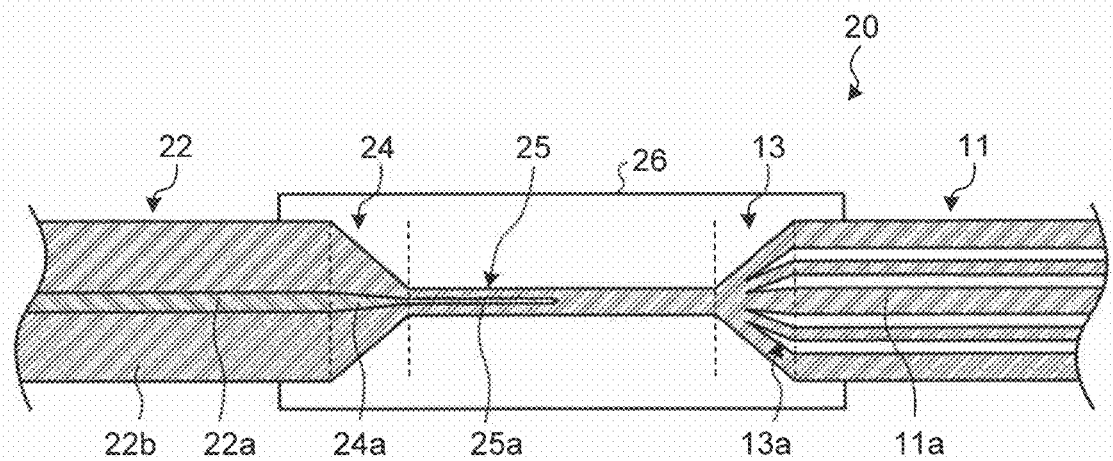
FIG. 7 is a cross section of a joint section of optical fibers manufactured by a method according to a second embodiment of the present invention along the length of the optical fibers.
Figure 8:
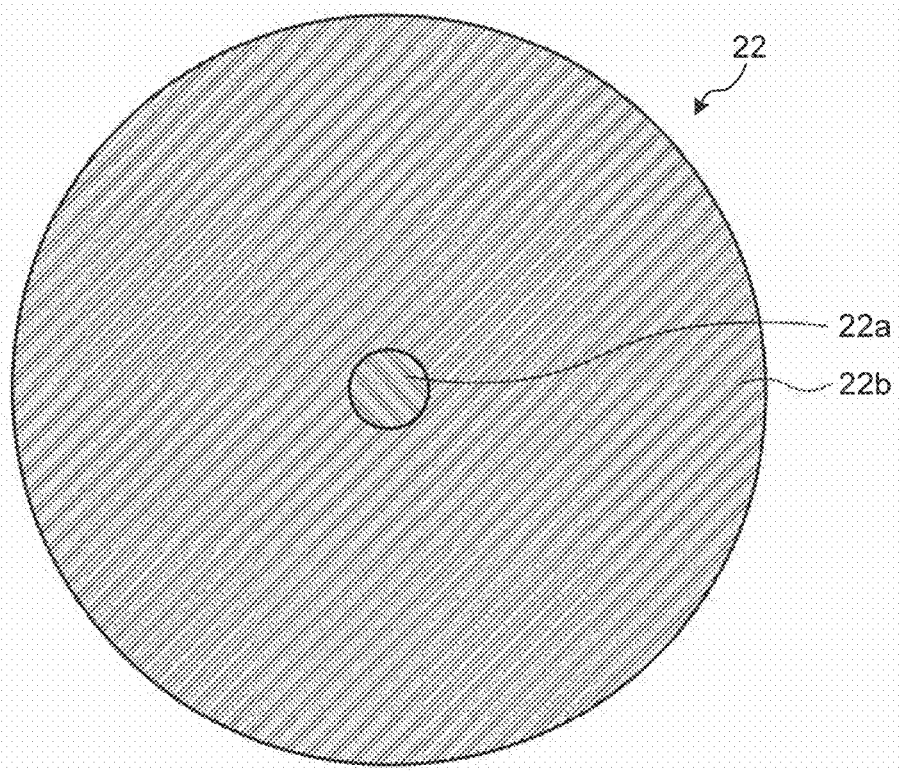
FIG. 8 is a cross section of the optical fiber shown in FIG. 7 perpendicular to the length of the optical fiber.
Figure 9:
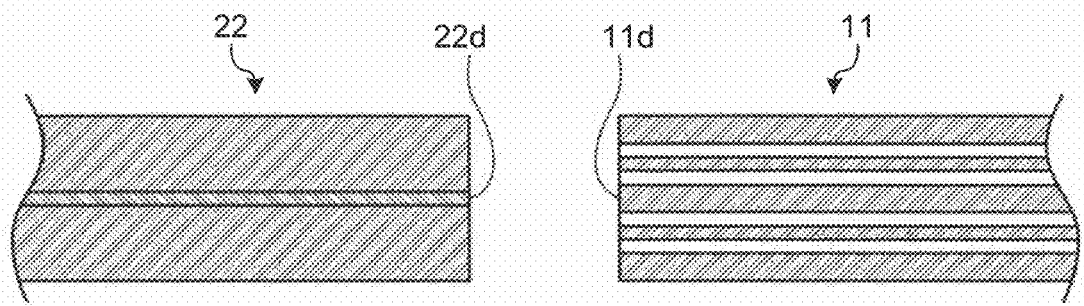
FIGS. 9 to 12 are schematic diagrams for explaining the method of manufacturing the connection structure shown in FIG. 7.

FIG. 7 is a cross section of an optical fiber that is manufactured by a method according to a second embodiment of the present invention along the length of the optical fiber. FIG. 8 is a cross section of an ordinary optical fiber 22 shown in FIG. 7 perpendicular to the length of the optical fiber 22. A connection structure 20 is formed by connecting the holey fiber 11 and the optical fiber 22 through the contracting section 13, a contracting section 24, and a stretched section 25. In the connection structure 20, a protection member 26 is formed to cover the contracting sections 13 and 24, and the stretched section 25.

The holey fiber 11 is the same as the one shown in FIGS. 1 and 2. By contrast, as shown in FIG. 8, the optical fiber 22 is a single-mode optical fiber having a core region 22a and a cladding region 22b surrounding the core region 22a. The refractive index of the cladding region 22b is lower than that of the core region 22a. The core region 22a is made of germanium-doped silica glass and the cladding region 22b is made of pure silica glass, i.e., silica glass without dopant, to control refractive index. A diameter of the core region 22a is about 10 micrometers and an outer diameter of the cladding region 22b is about 125 micrometers.

The contracting section 13 is the same as the one shown in FIG. 1. The contracting section 24 is coupled to an end surface of the optical fiber 22 and it gradually tapers. Similarly, a portion of the core region 22a, i.e., a core region 24a, tapers, and a portion of the core region 24a, i.e., a core region 25a, tapers and extends inside the stretched section 25.

The stretched section 25 has such a shape that an outer diameter is substantially uniform throughout the length of the stretched section 25 or a center portion of the stretched section 25 has a smaller outer diameter than those of the other sections of the stretched section 25. The stretched section 25 connects the contracting sections 13 and 24 to each other. In the stretched section 25 on a side coupled to the contracting section 24, the ultrathin core region 25a is formed. The stretched section 25 without the core region 25a is made of pure silica glass, and is arranged in a substantially concentric manner with the core regions 11a and 22a. The stretched section 25 has a substantially same outer diameter as those of the core regions 11a and 22a.

The protection member 26 is made of resin having a lower refractive index than that of the stretched section 25 and is formed around the contracting sections 13 and 24, and the stretched section 25 to protect them.

Similarity to the connection structure 10, in the connection structure 20, the stretched section 25 confines and propagates light from the core region 11a to the core region 22a with low transmission loss. Thus, in the connection structure 20, the holey fiber 11 and the optical fiber 22 are connected with low splice loss.

FIGS. 9 to 12 are schematic diagrams for explaining the method of manufacturing the connection structure 20.

Figure 10:
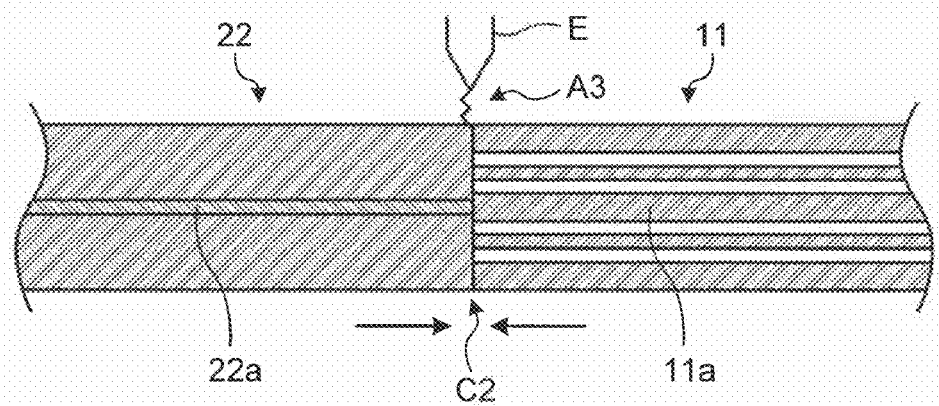

As shown in FIG. 10, arc-discharging "A3" is performed from the electrode "E" to a splicing point "C2". As a result, the holey fiber 11 and the optical fiber 22 are butt jointed by fusion-splicing. The duration and intensity of the arc discharge are determined so that the holey fiber 11 and the optical fiber 22 are connected with a good mechanical strength. Similarly to the first embodiment, desired exemplary settings are a discharge intensity of 60 milliamperes and a discharge duration of 1.5 seconds.

Figure 11:
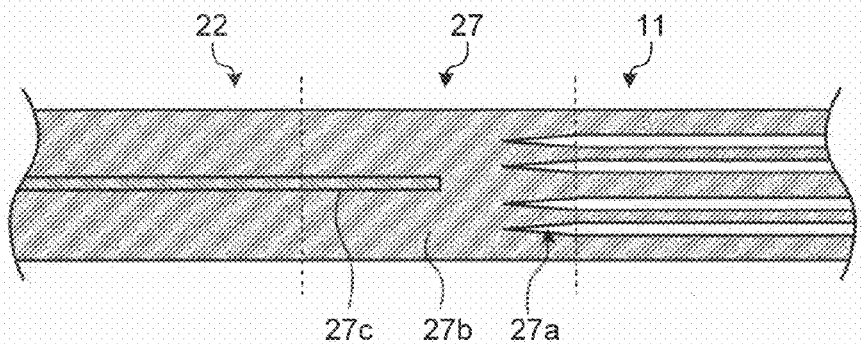

As shown in FIG. 11, a joint section 27 is formed between the holey fiber 11 and the optical fiber 22. The joint section 27 includes air holes 27a formed on its one end surface coupled to the holey fiber 11. The air holes 27a are gradually contracting toward a center section that is a solid portion 27b without air holes. A core region 27c, which has a substantially same diameter as that of the core region 22a, extends from the optical fiber 22 to a substantially center of the joint section 27.

Figure 12:
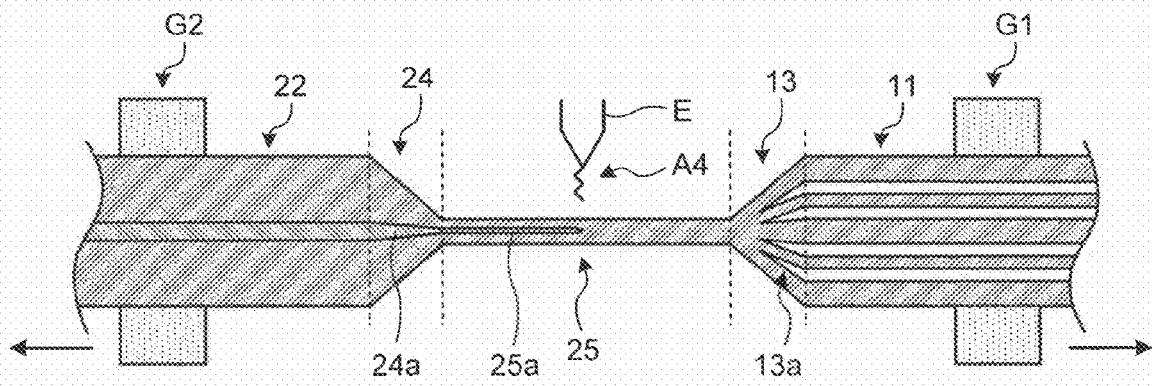

As shown in FIG. 12, the holey fiber 11 and the optical fiber 22 are held by the holding units G1 and G2, each of which includes v-grooves (not shown) and a retainer plate (not shown). In this situation, the holey fiber 11 and the optical fiber 22 are pulled away from each other while being subjected to the arc-discharging "A4" from the electrode "E" to the joint section 27. As a result, the joint section 27 is stretched, resulting in formations of the contracting sections 13 and 24, and the stretched section 25. The pulling of the holey fiber 11 and the optical fiber 22 is continued until the desired outer diameter of the stretched section 25 is attained. Because of the pulling, the core region 27c is made to be the extra thinner core region 25a. Finally, the protection member 26 is formed.

During the stretching process by the method according to the second embodiment, there is little risk of surface exposures of the air holes in the holey fiber 11 and in the contracting section 13. Moreover, a high mechanical strength and low splice loss at the joint section 27 are both attainable.

As explained above, the connection structure 20 with a high mechanical strength and low splice loss is easily manufacturable.

In a connection structure of optical fibers having the same structure as the one shown in FIG. 7, splice loss decreases in proportion to reduction of the outer diameter of a joint section by stretching. Specifically, if outer diameters are substantially the same between the stretched section and the core region of either one of a holey fiber and an optical fiber, the splice loss minimized.

The protection member can be made from a material other than resin as far as it protects the stretched section. For example, a typical protection sleeve can be used for reinforcing the fusion-spliced stretched section. If the protection sleeve is used as the protection member, the protection sleeve can accommodate the stretched section whereby the protection sleeve can be heated and fixed to the stretched section.

Furthermore, it is not mandatory to form the protection member. If the protection member is not formed, air surrounding the stretched section functions as an air cladding leading to formation of a light confinement structure. Moreover, in order to sufficiently reduce the splice loss, the outer diameter of the stretched section can be determined in accordance with a core diameter and a mold field diameter of an optical fiber, reflective indexes of a stretched section, a protection member, and air as appropriate. Furthermore, a multimode optical fiber can be used instead of the single-mode optical fiber.

According to an aspect of the present invention, after fusion-splicing a holey fiber and another optical fiber, which can be a holey fiber or an ordinary optical fiber, the joint section of the optical fibers is pulled while being heated until a predetermined outer diameter can be attained. Thus, a connection structure with a high mechanical strength and low splice loss can be manufactured easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of connecting a holey fiber to an optical fiber, the holey fiber includes a first core region and a first cladding region surrounding the first core region and having air holes arranged around the first core region, and the optical fiber includes at least a second core region and a second cladding region surrounding the second core region, the method comprising:

fusion splicing an end surface of the holey fiber and an end surface of the optical fiber thereby forming a joint section; and stretching the joint section while heating by pulling the holey fiber and the optical fiber away from each other in a longitudinal direction until an outer diameter of the joint section attains a predetermined value.

2. The method according to claim 1, wherein the stretching is performed such that the joint section is pulled until the outer diameter of the joint section attains substantially same outer diameter of the first core region of the holey fiber.

3. The method according to claim 1, wherein the optical fiber is a holey fiber in which the second cladding region has a plurality of air holes.

4. The method according to claim 1, further comprising forming a protection member that covers at least the joint section stretched at the stretching.

5. The method according to claim 4, wherein the forming includes coating the joint section with a resin having a lower refractive index than that of the joint section.

6. The method according to claim 4, wherein the forming includes accommodating the joint section into a protection sleeve and heating the protection sleeve whereby the protection sleeve is fixed to the joint section.

* * * * *